(12) United States Patent  (10) Patent No.: US 8,342,796 B2
Spencer et al.  (45) Date of Patent: Jan. 1, 2013

(54) DAMPING SYSTEMS FOR USE IN ENGINES

(75) Inventors: Douglas Spencer, Mesa, AZ (US);
Mohsiul Alam, Chandler, AZ (US);
Griff Kinsinger, Chandler, AZ (US)

(73) Assignee: Honeywell International Inc.,
Morristown, NJ (US)

( * ) Notice: Subject to any disclaimer, the term of this patent is extended or adjusted under 35 U.S.C. 154(b) by 1282 days.

(21) Appl. No.: 12/111,726

(22) Filed: Apr. 29, 2008

(65) Prior Publication Data

US 2009/0269185 A1  Oct. 29, 2009

(51) Int. Cl.
*F01D 25/04* (2006.01)
(52) U.S. Cl. .......................................... 415/113; 384/99
(58) Field of Classification Search .................... 384/99, 384/535, 581; 415/229, 113
See application file for complete search history.

(56) References Cited

U.S. PATENT DOCUMENTS

| 4,527,910 | A | | 7/1985 | Fleming |
| 4,872,767 | A | * | 10/1989 | Knapp ............................ 384/99 |
| 5,320,134 | A | | 6/1994 | Singh |
| 5,344,239 | A | | 9/1994 | Stallone et al. |
| 6,679,045 | B2 | * | 1/2004 | Karafillis et al. ............. 415/111 |
| 2002/0136473 | A1 | | 9/2002 | Mollmann |

FOREIGN PATENT DOCUMENTS

GB  1418907 A  * 12/1975

* cited by examiner

*Primary Examiner* — Richard Edgar
(74) *Attorney, Agent, or Firm* — Ingrassia Fisher & Lorenz, P.C.

(57) ABSTRACT

Damping systems and engines including the damping systems are provided. In one embodiment, and by way of example only, the damping system includes a rotor, a bearing assembly mounted to the rotor, a spring cage disposed around the bearing assembly, an axially-extending housing surrounding the spring cage, a first squeeze film damper formed between the bearing assembly and the spring cage, and a second squeeze film damper formed between the spring cage and the axially-extending housing.

13 Claims, 3 Drawing Sheets

DAMPING SYSTEMS FOR USE IN ENGINES

TECHNICAL FIELD

The inventive subject matter relates to turbine engines for aircraft and, more particularly, to damping systems for use in a cold or hot section of the engine, such as, for example, in a compressor section.

BACKGROUND

A turbofan gas turbine engine may be used to power aircraft and may include, for example, a fan section, a compressor section, a combustor section, a turbine section, and an exhaust section, where each section has components that are mounted to a rotor. The fan section induces air from the surrounding environment into the engine and accelerates a fraction of the air toward the compressor section. The remaining fraction of air is accelerated into and through a bypass plenum, and out the exhaust section.

The compressor section, which may include a high pressure compressor and a low pressure compressor, raises the pressure of the air it receives from the fan section to a relatively high level. The compressed air then enters the combustor section, where a ring of fuel nozzles injects a steady stream of fuel into a plenum. The injected fuel is ignited to produce high-energy compressed air. The air then flows into and through the turbine section causing turbine blades therein to rotate and generate energy. This energy is used to power the fan and compressor sections. The air exiting the turbine section is exhausted from the engine via the exhaust section, and the energy remaining in the exhaust air aids the thrust generated by the air flowing through the bypass plenum.

During engine operation when the rotor rotates, one or more of the components may be unbalanced which may cause vibration. To at least partially dampen the vibration, damping systems are typically incorporated into the engine. The damping systems may include isolators, shock absorbers, or other damping devices; however, as the desire for greater power output continues to increase, these conventional damping systems may not adequately damp the corresponding increases in engine vibration.

Hence, there is a need for an improved damping system for use in an engine. It is desirable for the system to be relatively lightweight, simple, and inexpensive to implement.

BRIEF SUMMARY

The inventive subject matter provides an improved damping system for use in an engine.

In one embodiment, and by way of example only, the damping system includes a rotor, a bearing assembly mounted to the rotor, a spring cage disposed around the bearing assembly, an axially-extending housing surrounding the spring cage, a first squeeze film damper formed between the bearing assembly and the spring cage, and a second squeeze film damper formed between the spring cage and the axially-extending housing.

In another embodiment, and by way of example only, the damping system includes a rotor, a bearing assembly, a spring cage, an axially-extending housing, and a first seal and a second seal. The bearing assembly is mounted to the rotor and includes an inner race, an outer race, and a rolling element, where the inner race is coupled to the rotor, the outer race surrounds the inner race and has an outer surface, and the rolling element is disposed between the inner race and the outer race. The spring cage at least partially surrounds the bearing assembly outer race and includes an inner surface and an outer surface. The inner surface of the spring cage is spaced apart from the outer surface of the outer race to define a first clearance therebetween. The axially-extending housing surrounds at least a portion of the spring cage and has an inner surface spaced apart from the outer surface of the spring cage to define a second clearance. The first seal and the second seal are disposed within the second clearance.

In still another embodiment, an engine is provided. The engine includes an engine case, a compressor section disposed within the engine case, a rotor extending through the compressor section, and a bearing assembly mounted to a portion of the rotor. The engine also includes a spring cage disposed around the bearing assembly, an axially-extending housing surrounding the spring cage, a first squeeze film damper formed between the bearing assembly and the spring cage, and a second squeeze film damper formed between the spring cage and the axially-extending housing.

Other independent features and advantages of the preferred damping system will become apparent from the following detailed description, taken in conjunction with the accompanying drawings which illustrate, by way of example, the principles of the inventive subject matter.

DETAILED DESCRIPTION

Before proceeding with the detailed description, it is to be appreciated that the described embodiments are not limited to use in conjunction with a particular type of turbine engine. Thus, although the present embodiments are, for convenience of explanation, depicted and described as being implemented in a multi-spool turbofan gas turbine jet engine, it will be appreciated that it can be implemented in various other types of turbine engine, and in various other systems and environments. Moreover, although the embodiments of the inventive subject matter are described as being implemented into a compressor section of the engine, it will be appreciated that the embodiments of the inventive subject matter may alternatively be used in any other section of the engine that may need vibration damping.

Figure 1:
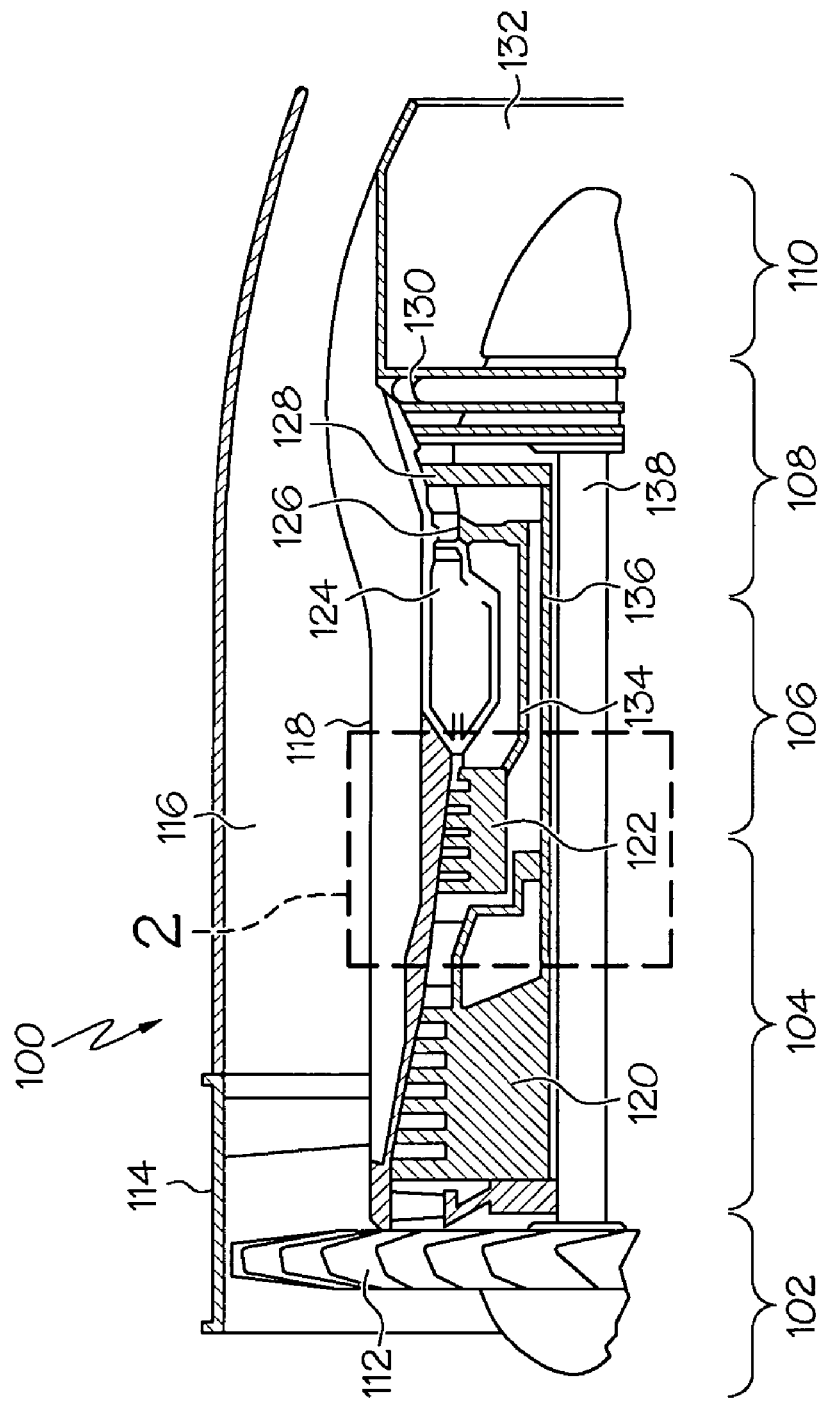
FIG. 1 is a simplified cross section side view of a gas turbine engine, according to an embodiment.

FIG. 1 is a simplified, schematic of a gas turbine engine 100, according to an embodiment. The gas turbine engine 100 generally includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine bypass duct 118, and provides a forward thrust. The remaining fraction of air exhausted from the fan 112 is directed into the compressor section 104.

The compressor section 104 includes an intermediate pressure compressor 120 and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes an annular combustor 124, the high pressure air is mixed with fuel and combusted. The combusted air is then directed into the turbine section 108.

The turbine section 108 includes a high pressure turbine 126, an intermediate pressure turbine 128, and a low pressure turbine 130 disposed in axial flow series. The combusted air from the combustion section 106 expands through the turbines 126, 128, 130 causing each to rotate. The air is then exhausted through a propulsion nozzle 132 disposed in the exhaust section 110, providing additional forward thrust. As the each turbine 126, 128, 130 rotates, each drives equipment in the engine 100 via concentrically disposed shafts or spools. Specifically, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
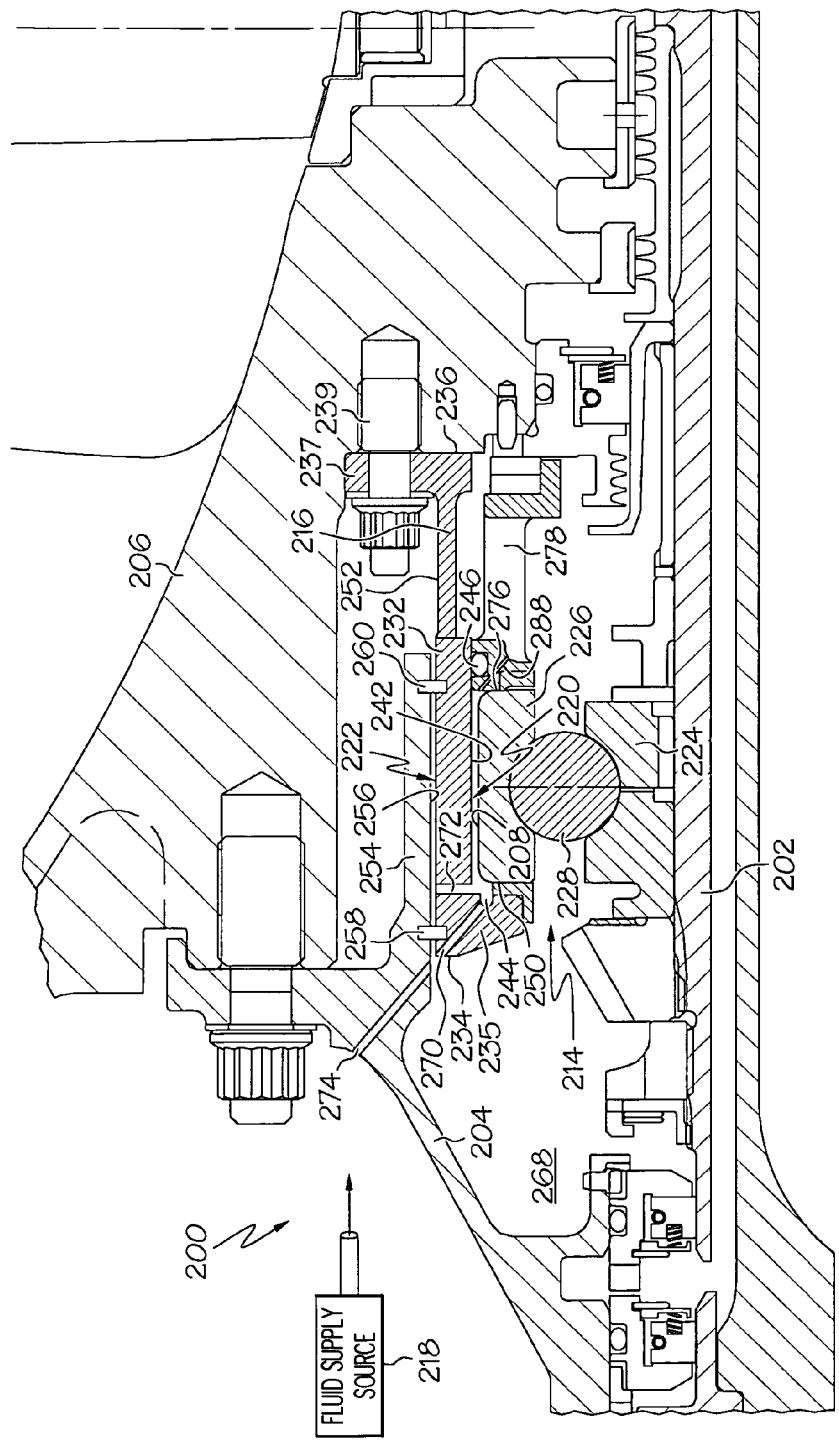
FIG. 2 is a close-up view of a portion of the compressor section indicated by dotted line 2 shown in FIG. 1, according to an embodiment.

To at least partially alleviate vibration that may occur during engine operation, a damping system may be included in the engine. FIG. 2 is a close-up view of an embodiment of a portion of a compressor section indicated by dotted line 2 in FIG. 1 including a damping system 200. In an embodiment, the damping system 200 is mounted to a rotor 202 and may be disposed between a front static frame structure 204 and an aft static frame structure 206. Each of the static frame structures 204, 206 may extend from an outer housing or other static, non-rotating portion of the engine. In other embodiments, the damping system 200 may be disposed between other static structures through which a rotor may extend. In any case, the damping system 200 includes a bearing assembly 214, a spring cage 216, a first squeeze film damper 220, and a second squeeze film damper 222.

The bearing assembly 214 is made up of an inner race 224, an outer race 226, and a rolling element 228 disposed therebetween. The inner race 224 may be coupled to the rotor 202, as shown in FIG. 2, or in other embodiments may be indirectly coupled thereto via additional components. The inner race 224 may have an inner diameter in a range of between about 8 cm to about 10 cm, in an embodiment. In other embodiments, the inner diameter may be larger or smaller. The outer race 226 at least partially surrounds the inner race 224 and is configured to maintain the rolling element 228 in position relative to the inner race 224. In this regard, the outer race 226 may have an inner diameter that is sufficient to define a space with the inner race 224 within which the rolling element 228 is disposed and within which the rolling element 228 may rotate. The particular dimensions of the inner diameter of the outer race 226 may therefore be dependent on the outer diameter of the inner race 224 and the diameter of the rolling element 228. For example, the outer diameter of the inner race 224 may be in a range of between about 8 cm to about 10 cm, and the diameter of the rolling elements 228 may be in a range of between about 1 cm to about 2 cm. In such case, the inner diameter of the outer race 226 may be in a range of between about 9 cm to about 12 cm. In other embodiments, the outer race inner diameter may be larger or smaller. The outer race 226 also has an outer surface 208 that may be configured to make up a part of the first squeeze film damper 220. In such case, the outer race 226 may have an outer diameter in a range of between about 14 cm to about 16 cm, in an embodiment. In other embodiments, the outer diameter may be larger or smaller, depending on the dimensions of surrounding components. Additionally, although the rolling element 228 is shown as a single ball, it may be understood that bearing comprises more balls. In other embodiments, the balls may be replaced with rollers, or other suitable alternatives.

The spring cage 216 is disposed around the bearing assembly 214 and is configured to deflect a load that may be received therefrom. To do so, the spring cage 216 may be made of a relatively flexible material capable of maintaining structural integrity when subjected to loads of at least 2224 N. Suitable materials include, but are not limited to, steel or titanium. In an embodiment, the spring cage 216 is made up of at least an axially-extending ring portion 232 that has a forward end 234 and an aft end 236. The axially-extending ring portion 232 at least partially surrounds the outer race 226 and thus has an axial length that at least corresponds with an axial length of the bearing assembly 214. In an embodiment, the ring portion 232 may have an axial length that is between about 3 cm to about 5 cm. In other embodiments, the axial length may be less or greater, depending on the dimensions of the bearing assembly 214 and other components surrounding the spring cage 216.

The forward and aft ends 234, 236 each may include flanges 235, 237. In an embodiment, the forward flange 235 may extend radially inwardly from the forward end 234. In an embodiment, the forward flange 235 may have a radial length that is sufficient to ensure positioning of the bearing assembly 214 relative to the forward and aft static frame structures 204, 206 or to form part of a fluid flow path. For example, the radial length may be in a range of between about 1 cm to about 3 cm, in an embodiment. However, in other embodiments, the radial length may be longer or shorter, depending on the dimensions of the surrounding components. The aft flange 237 may be included to mount the spring cage 216 to the aft static frame structure 206. For example, the aft flange 237 and aft static frame structure 206 may be attached together by a bolt 239, in an embodiment, or other fastening means in other embodiments. In an embodiment, the aft flange 237 extends radially outwardly from the aft end 236 and has a radial length that provides the aft flange 237 with a sufficient area to maintain structural integrity when mounted to the aft static frame structure 206. For example, the radial length may be in a range of between about 2 cm to about 4 cm in an embodiment, but may be longer or shorter depending on the particular dimensions of the surrounding components. Although the aft flange 237 is shown as extending radially outwardly from the spring cage 216, it may extend radially inwardly, in other embodiments. In still other embodiments, the aft flange 237 may not be included and the spring cage aft end 236 may be directly mounted to the aft static frame structure 206.

As alluded to above, the first squeeze film damper 220 is configured to damp a load that may be received from the rotor 202. The first squeeze film damper 220 is defined by a clearance between the outer surface 208 of the bearing assembly outer race 226 and an inner surface 242 of the ring portion 232 that is filled with fluid during system 200 operation. In an embodiment, the clearance may have a radial width in a range of between about 0.1 mm and about 0.2 mm and an axial length in a range of between about 10 mm and about 40 mm; however, the particular dimensions of the clearance may depend on a desired magnitude of damping to be provided by the first squeeze film damper 220. The clearance may additionally have an inlet 244 located thereon and a seal 246 disposed therein, in an embodiment. The inlet 244 may be located at one end of the clearance to allow the fluid to enter into the damper 220, while the seal 246 may be placed at another location away from the inlet 244 to block fluid flow out of the clearance. In an embodiment, the seal 246 may be an annular seal, such as an o-ring-type seal, or another type of seal that may be substantially resistant to corrosion when exposed to the fluid. Additionally, although the seal 246 is shown as being disposed between a forward flange 278 of a seal retainer and the spring cage 216, other placement configurations alternatively may be employed.

The second squeeze film damper 222 provides additional damping when the spring cage 216 deflects in response to the transmission of a load from the first squeeze film damper 220. In this regard, the second squeeze film damper 222 is located radially outwardly from the first squeeze film damper 220 and may be defined, in part, by a clearance between the spring cage 216 and the forward static frame structure 204. In an embodiment, the clearance is formed between an outer surface 252 of the ring portion 232 and an inner surface 256 of a housing 254 extending axially from the forward static frame structure 204. The axially-extending housing 254 may be a cylindrical projection integrally formed as part of the forward static frame structure 204, in an embodiment. In other embodiments, the two may be separately formed and either coupled together or placed adjacent to each other. The clearance may have a radial width of between about 0.1 mm and about 0.2 mm, in an embodiment; however, in other embodiments, the radial width may be larger or smaller depending on a desired magnitude of damping to be provided by the second squeeze film damper 222.

The second squeeze film damper 222 may have an axial length that extends between two seals 258, 260 disposed within the clearance. The seals 258, 260 are adapted to confine the fluid within the damper 222 during engine operation and may be made up of piston ring seals, O-rings, or other similar types of seals that may be substantially resistant to corrosion when exposed to the fluid. In any case, the axial length of the second squeeze film damper 222 may be in a range of between about 1 cm to about 4 cm, in an embodiment. In other embodiments, the axial length may be longer or shorter, depending on a desired magnitude of damping to be provided by the second squeeze film damper 222.

To provide the fluid to the first and second squeeze film dampers 220, 222, a fluid flow path is included in the damping system 200. In an embodiment, as shown in FIG. 2, the fluid flow path may include a first squeeze film fluid supply path 270, and a second squeeze film fluid supply path 272 that are in fluid communication with each other. The cavity 268 is defined in part by the bearing assembly 214 and surrounding components (e.g., the forward and aft static frame structures 204, 206). For example, in an embodiment, fluid may be directed from a fluid supply source 218 into a fluid supply opening 274 that may be formed in the forward static frame structure 204. The opening 274 may have a cross-sectional flow area of between about 1 mm² and about 2 mm², in an embodiment. In other embodiments, the flow area may be larger or smaller. In another embodiment, the opening 274 may be formed in another section, as long as the fluid supply source 218 may feed fluid to the cavity 244. Additionally, although a single opening 274 is shown, more may alternatively be employed in other embodiments.

In another embodiment the fluid supply opening 274 discharges into the second squeeze film damper 222 between seal 258 and 260, and the oil then goes through supply path 272 to the cavity 244 to supply the first squeeze film damper 220 discharging into cavity 268 via a regulating orifice 288.

The first squeeze film fluid supply path 274 directs a portion of the fluid from the fluid source 218 into the opening 270 into the first squeeze film damper 220. In an embodiment a flexible connection is located between 274 and 270. In an embodiment, as shown in FIG. 2, the first squeeze film fluid supply path 270 is formed through the spring cage 216. For example, the first squeeze film fluid supply path 270 may be formed adjacent the forward end 234 of the spring cage 216. In another embodiment, the first squeeze film fluid supply path 270 may be formed through the forward flange 235 of the spring cage 216.

The second squeeze film fluid supply path 272 allows fluid communication between the first squeeze film damper 220 and the second squeeze film damper 222. In this regard, the second squeeze film fluid supply path 272 may extend through the ring portion 232 of the spring cage 216, as shown in FIG. 2. In an embodiment, the second squeeze film fluid supply path 272 may be a single path. However, in other embodiments, the second squeeze film fluid supply path 272 may be made up of more than one pathway. In any case, the second squeeze film fluid supply path 272 may have a total cross-sectional flow area in a range of between about 1 mm² to about 2 mm², in an embodiment. Alternatively, the second squeeze film fluid supply path 272 may have a flow area that is smaller or larger than the aforementioned range.

Although the second squeeze film fluid supply path 272 is shown as being located proximate the forward flange 235 of the spring cage 216, it may be formed elsewhere in other embodiments. In one embodiment, the location of the second squeeze film fluid supply path 272 may depend on a location of the first squeeze film fluid supply path 270. Thus, for example, in embodiments in which the first squeeze film fluid supply path 270 is disposed proximate the aft end 276 of the outer race 226, the second squeeze film fluid supply path 272 may be located proximate the forward end 250 of the outer race 226.

Figure 3:
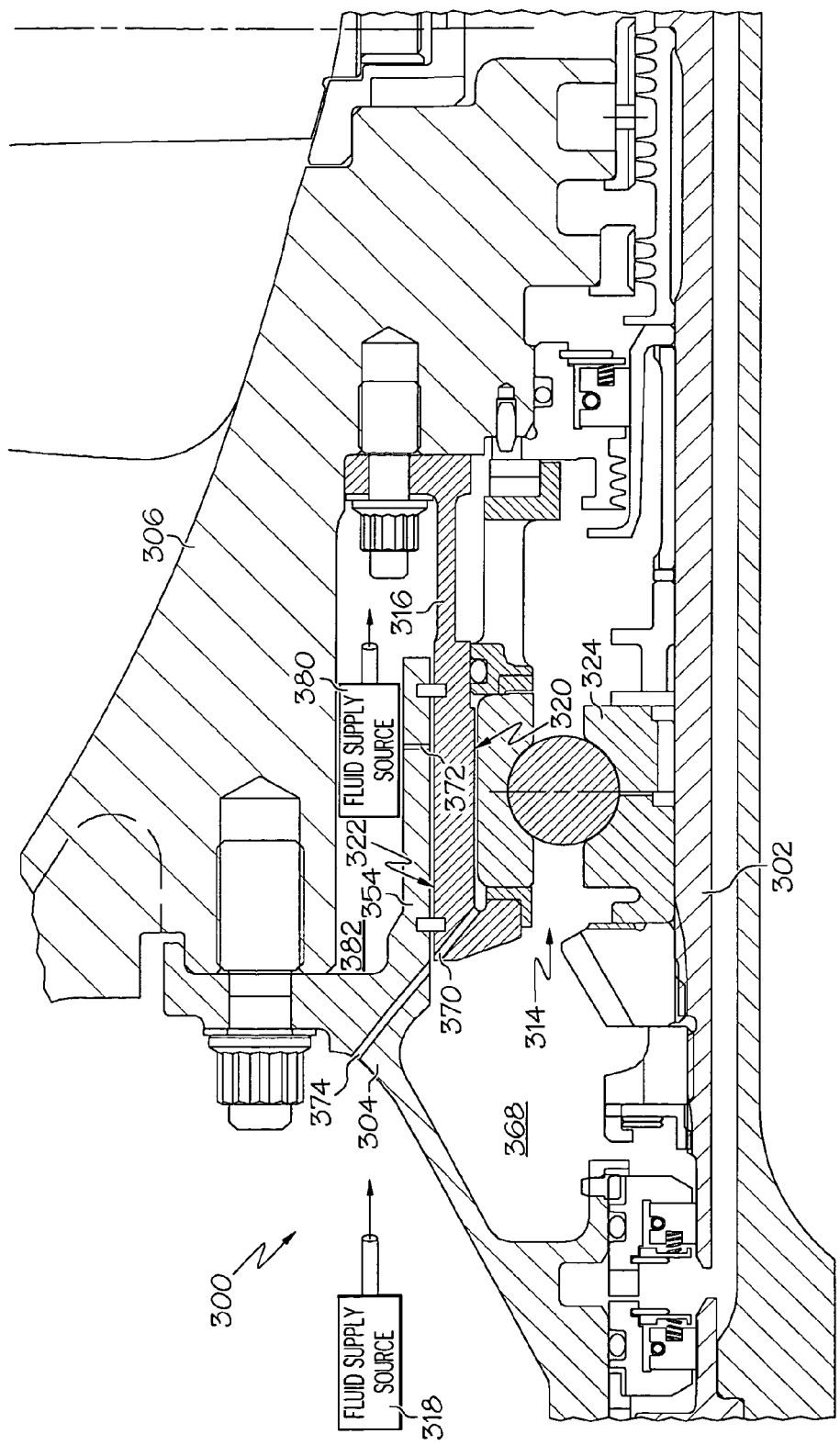
FIG. 3 is a close-up view of a portion of a compressor section including a damping system, according to another embodiment.

In another embodiment, the second squeeze film fluid supply path 272 may not be formed in the spring cage 216, as shown in FIG. 3, which is a close-up view of a portion of a compressor section including a damping system 300 having a fluid flow path, according to another embodiment. The fluid flow path shown herein is similar to that illustrated in FIG. 2 except that the first and second fluid supply paths 370, 372 are supplied by separate fluid supply sources 318, 380. In an embodiment, a first fluid supply source 318 directs fluid through a fluid supply opening 374 formed through a portion of the forward static frame structure 304, in an embodiment, but alternatively may be formed in other suitable sections in other embodiments. The fluid then flows from the fluid supply opening 374 into the first fluid supply path 370 formed in a portion of a spring cage 316, and a portion of the fluid is directed into a first squeeze film damper 320. In an embodiment, a flexible connection is located between 374 and 370.

In an embodiment, the second squeeze film fluid supply path 372 is formed in a portion of the forward static frame structure 304, such as in a housing 354 extending axially therefrom. Fluid is supplied to the path 372 by the second fluid supply source 380. Although the second fluid supply source 380 is shown as being disposed in a second cavity 382 defined between the forward static frame structure 304, an aft static frame structure 306, and a spring cage 316, it may be disposed in a different section of the engine allowing fluid communication with the second squeeze film fluid supply path 372. In any case, the second squeeze film fluid supply path 372 provides fluid communication between the second fluid supply source 380 and the second squeeze film damper 322.

By including a dual squeeze film damping system in the engine, an improved damping system has now been provided. The placement of the dual squeeze film damping system around a spring cage allows damping of vibrations from an unbalanced rotor, which may whirl during rotation. Additionally, because both squeeze film dampers may be fed fluid via one or two oil sources, implementation may be relatively simple.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A damping system for use in an engine, the damping system comprising:
   a rotor;
   a bearing assembly mounted to the rotor;
   a spring cage disposed around the bearing assembly;
   an axially-extending housing surrounding the spring cage;
   a first squeeze film damper formed between the bearing assembly and the spring cage;
   a second squeeze film damper formed between the spring cage and the axially-extending housing;
   a first fluid supply source configured to supply fluid to the first squeeze film damper; and
   a second fluid supply source configured to supply fluid to the second squeeze film damper.

2. The damping system of claim 1, wherein:
   the bearing assembly includes an inner race, an outer race, and a rolling element, the inner race coupled to the rotor, the outer race surrounding the inner race and having an outer surface, and the rolling element disposed between the inner race and the outer race;
   the spring cage at least partially surrounds the bearing assembly outer race and includes an inner surface spaced apart therefrom to define a first clearance therebetween; and
   the first squeeze film damper is defined by the first clearance.

3. The damping system of claim 2, wherein:
   the spring cage has an outer surface;
   the axially-extending housing has an inner surface spaced apart from the outer surface of the spring cage to define a second clearance; and
   the second squeeze film damper is defined by the second clearance.

4. The damping system of claim 3, further comprising:
   a first seal and a second seal each disposed within the second clearance.

5. The damping system of claim 1, further comprising a forward static frame structure from which the axially-extending housing extends, wherein the forward static frame structure includes an opening therein and the first fluid supply source directs fluid through the opening toward the first squeeze film damper.

6. The damping system of claim 1, wherein the first fluid supply source is further adapted to supply fluid to the second squeeze film damper.

7. The damping system of claim 1, further comprising:
   a first supply path adapted to supply fluid from the first fluid supply source to the first squeeze film damper; and
   a second supply path formed in the axially extending housing and adapted to provide fluid communication between the second fluid supply source and the second squeeze film damper.

8. A damping system for use in an engine, the damping system comprising:
   a rotor;
   a bearing assembly mounted to the rotor including an inner race, an outer race, and a rolling element, the inner race coupled to the rotor, the outer race surrounding the inner race and having an outer surface, and the rolling element disposed between the inner race and the outer race;
   a spring cage at least partially surrounding the bearing assembly outer race and including an inner surface and an outer surface, the inner surface of the spring cage spaced apart from the outer surface of the outer race to define a first clearance therebetween;
   an axially-extending housing surrounding at least a portion of the spring cage and having an inner surface spaced apart from the outer surface of the spring cage to define a second clearance;
   a first fluid supply source configured to supply fluid to the first clearance;
   a second fluid supply source configured to supply fluid to the second clearance; and
   a first seal and a second seal disposed within the second clearance.

9. The damping system of claim 8, wherein the spring cage includes a supply path extending therethrough to provide fluid communication between the first clearance and the second clearance.

10. The damping system of claim 8, further comprising a forward static frame structure from which the axially-extending housing extends, wherein the forward static frame structure includes an opening therein and the first fluid supply source directs fluid through the opening toward the first clearance.

11. The damping system of claim 8, wherein the first fluid supply source is further adapted to supply fluid to the second clearance.

12. An engine, comprising:
   an engine case;
   a compressor section disposed within the engine case;
   a rotor extending through the compressor section;
   a bearing assembly mounted to a portion of the rotor;
   a spring cage disposed around the bearing assembly;
   an axially-extending housing surrounding the spring cage;
   a first squeeze film damper formed between the bearing assembly and the spring cage;
   a second squeeze film damper formed between the spring cage and the axially-extending housing;
   a first fluid supply source configured to supply fluid to the first squeeze film damper; and
   a second fluid supply source configured to supply fluid to the second squeeze film damper.

13. The damping system of claim 12, wherein the first fluid supply source is further adapted to supply fluid to the second squeeze film damper.

* * * * *